(12) United States Patent
Ludwig et al.

(10) Patent No.: US 9,954,804 B2
(45) Date of Patent: Apr. 24, 2018

(54) METHOD AND SYSTEM FOR PREEMPTIVE HARVESTING OF SPAM MESSAGES

(71) Applicant: International Business Machines Corporation, Armonk, NY (US)

(72) Inventors: Markus Ludwig, Breuna (DE); Johannes R. Noll, Ronshausen (DE); Matthias Seul, Kassel (DE); Volker G. A. Vogeley, Bad Sooden-Allendorf (DE)

(73) Assignee: International Business Machines Coporation, Armonk, NY (US)

( * ) Notice: Subject to any disclaimer, the term of this patent is extended or adjusted under 35 U.S.C. 154(b) by 201 days.

(21) Appl. No.: 14/813,184

(22) Filed: Jul. 30, 2015

(65) Prior Publication Data
US 2017/0034089 A1 Feb. 2, 2017

(51) Int. Cl.
*G06F 15/16* (2006.01)
*H04L 12/58* (2006.01)

(52) U.S. Cl.
CPC .............. *H04L 51/12* (2013.01); *H04L 51/14* (2013.01)

(58) Field of Classification Search
None
See application file for complete search history.

(56) References Cited

U.S. PATENT DOCUMENTS

| | | | |
|---|---|---|---|
| 8,135,778 B1* | 3/2012 | Chin | G06Q 10/107 709/206 |
| 8,549,081 B2 | 10/2013 | Leiba et al. | |
| 8,572,737 B2 | 10/2013 | Holloway et al. | |
| 8,769,677 B2 | 7/2014 | Vashist et al. | |
| 8,874,658 B1* | 10/2014 | Khalsa | H04L 51/12 709/206 |
| 8,909,591 B1 | 12/2014 | Grundman et al. | |
| 2005/0055404 A1* | 3/2005 | Kitchen, Jr. | H04L 51/12 709/206 |
| 2006/0168042 A1* | 7/2006 | Boivie | H04L 51/12 709/206 |
| 2007/0078936 A1* | 4/2007 | Quinlan | G06Q 10/107 709/206 |
| 2007/0088789 A1* | 4/2007 | Berman | H04L 51/12 709/206 |
| 2009/0113016 A1* | 4/2009 | Sen | G06Q 10/107 709/207 |
| 2012/0151585 A1* | 6/2012 | Lamastra | H04L 51/12 726/24 |

(Continued)

FOREIGN PATENT DOCUMENTS

EP 2811699 A1 12/2014
WO 2013112062 A1 8/2013

*Primary Examiner* — Joshua Joo
(74) *Attorney, Agent, or Firm* — Issac J. Gooshaw

(57) ABSTRACT

A processor attracts and harvests spam messages. The processor simulates a message relay server. The processor receives one or more messages for the message relay server. The processor relays a message that is included in the one or more messages based on a determination that a pattern of the message matches a first identification pattern for probe messages. The processor captures a second message that originated from an IP address of the relayed probe message. The processor processes the one or more messages and the second message to generate an identification pattern that identifies potential spam messages.

20 Claims, 5 Drawing Sheets

(56) References Cited

U.S. PATENT DOCUMENTS

| | | | |
|---|---|---|---|
| 2016/0073281 A1* | 3/2016 | Zhou ..................... | H04W 4/08 370/230 |
| 2016/0142352 A1* | 5/2016 | Skudlark ................ | H04L 51/12 709/206 |

* cited by examiner

US 9,954,804 B2

METHOD AND SYSTEM FOR PREEMPTIVE HARVESTING OF SPAM MESSAGES

BACKGROUND OF THE INVENTION

The present invention relates generally to the field of communication, and more particularly to spam messages.

In the field of spam protection, identifying new and previously unknown spam messages is important to the quality and accuracy of any anti-spam solution, in particular for the development and improvement of anti-spam software, as said messages provide the option to derive new signatures and patterns for the protection of customers.

While heuristics and statistical learning methods for identifying spam messages have made great strides in the last few years, still more than half of the spam messages coverage by anti-spam software is provided based on traditional signature or pattern based methods. Furthermore, additionally feeding heuristics and learning methods with current data based on harvested spam messages may further increase the effectiveness of these methods.

SUMMARY

Embodiments of the present invention provide a method, system, and program product for attracting and harvesting spam messages. A processor simulates a message relay server. The processor receives one or more messages for the message relay server. The processor relays, to its target destination, a first message that is included in the one or more messages based, at least in part, on a determination that a pattern of the first message matches, at least in part, a first identification pattern for probe messages. The processor captures, for a relayed probe message, a second message that originated from an IP address of the relayed probe message. The processor processes the one or more messages and the second message to generate an identification pattern that identifies potential spam messages.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
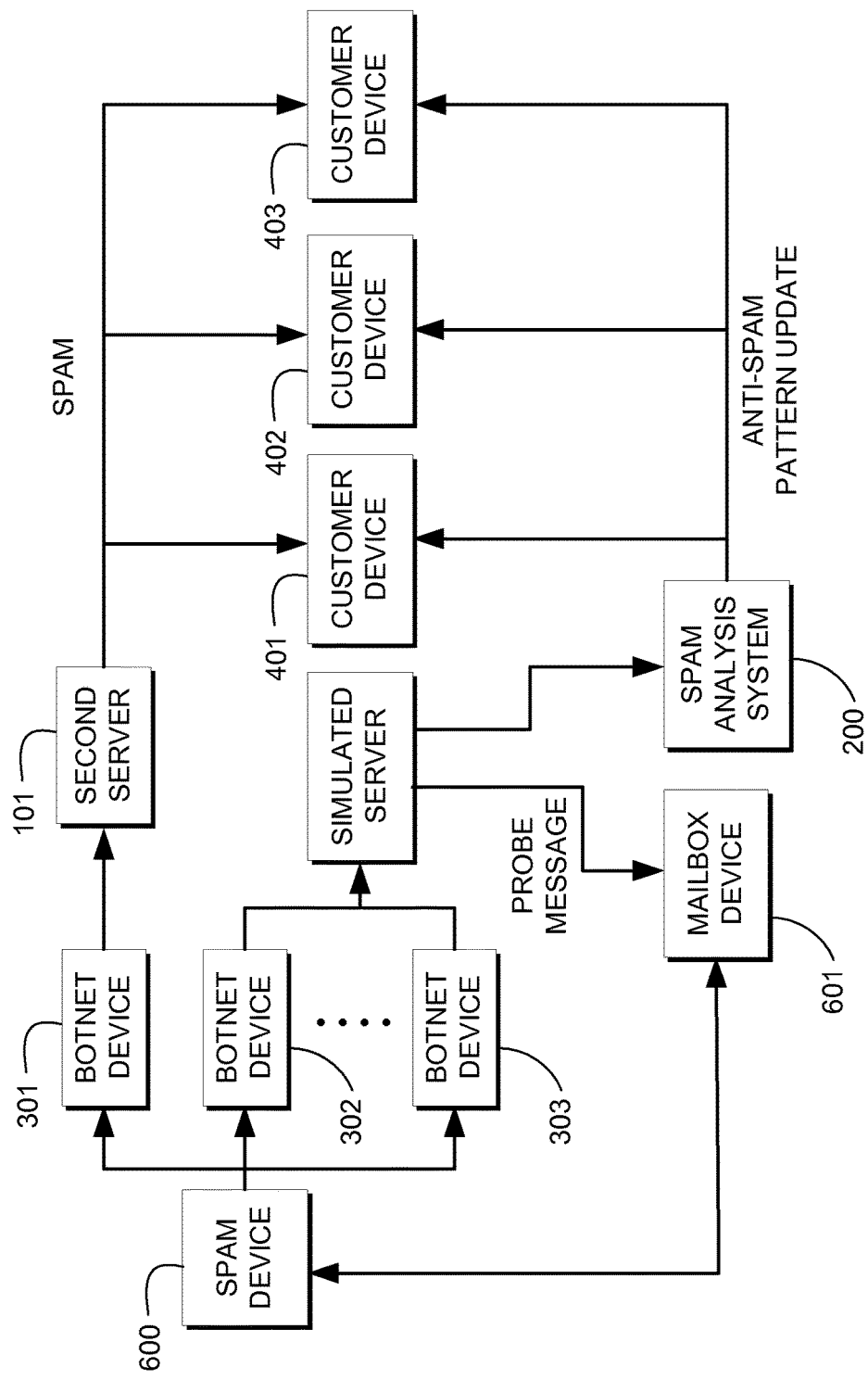
FIG. 1 depicts a schematic block diagram illustrating an exemplary network environment including a simulated message relay server, in accordance with an exemplary embodiment of the present invention.

Traditional spam capturing works by setting up a plurality of so-called "honeypot" mailboxes designed to attract traffic sent out by spammers. These honeypot mailboxes are email addresses under the control of a spam researcher or anti-spam software developer. These email addresses are then publicized in certain areas of the internet known or suspected to be scanned by spammers on the search for new mailboxes for their spam campaigns. The email addresses are for example, published in internet forums, newsgroups etc. or they may be used for signing up for newsletters in hopes that they will be picked up by spammers.

With this traditional honeypot approach a copy of a spam wave may be received on the honeypots as target destinations of the spam messages, the received spam messages are processed and signatures and/or heuristics are extracted, based on these signatures and/or heuristics updates are generated for anti-spam programs used by customers in order to detect and to block or to weep out spam messages. These updates are deployed to the customers.

The problem with this approach is that these honeypot mailboxes may receive the spam traffic at the same time as the customers they are designed to protect. This means that no protection against new types of spam messages may be provided for the period of time between receiving the new spam messages by the honeypots, processing the respective messages for extracting anti-spam signatures and delivering updates based on said signatures to anti-spam products used by customers.

Embodiments of the present invention recognize that anti-spam methods are required to keep the time for processing near zero, which often makes in-depth analysis too time-intensive to be effective. Embodiments of the present invention recognize that available options for spam protection can be limited.

Herein, one or more embodiments of the present invention provide spam detection techniques that include string identification, pre-filtering, and character histogram and timestamp comparison steps are provided which facilitate accurate, computationally-efficient detection of rapidly-changing spam arriving in short-lasting waves.

Embodiments of the present invention recognize that at least one known solution includes a system and method for spam filtering using shingles. The system receives an electronic message including at least a text portion, identifies in the received message insignificant text portions, and removes identified insignificant text portions to generate an abridged message. The system generates a set of shingles from the abridged message and identifies, in the generated set of shingles, one or more shingles that occur only in messages not containing spam. The system removes one or more identified shingles from the generated set of shingles to generate a reduced set of shingles, and performs spam filtering of the reduced set of shingles to determine whether the received message contains spam.

Embodiments of the present invention recognize that at least one known solution includes detection of spam using contextual analysis of data sources is described, wherein business listing characteristics in trusted sources and untrusted sources are identified. Statistical analysis of the frequency of characteristics within each source is used to identify common characteristics of spam listings, wherein these characteristics are further analysed in specific listing contexts. Furthermore, methods for leveraging this context-specific statistical information to improve spam detection operations are described.

In the following the term "relay" will be used synonymously for "message relay server". When referring to a "simulated" message relay server, a server configuration is meant which for the sender of a message looks like a message relay server, i.e. a server which is part of a relay chain, wherein the server receives messages and delivers the respective messages to or towards their target destinations. For a probe message, the message relay server according to the present disclosure behaves like a usual message relay server and delivers the probe message to its target destination. However, the respective server may only be a simulated message relay server in the sense that potential spam messages are preemptively captured and not relayed to their target destinations. Messages according to the present disclosure may for example be emails according to the Simple Mail Transfer Protocol (SMTP) protocol. Messages may also be sent according to the Hypertext Transfer Protocol (HTTP) protocol. A probe message is a message sent by a spammer in order to probe the availability and functionality of a message relay server which the spammer intends to use for their spam campaign. In general, a probe message is designed not to trigger any signatures associated with spam messages in order to pass anti-spam detections undetected. Probe messages are usually sent to a target destination, like an email address, owned by the spammer, such that the spammer is enabled to check whether the probe message has reached its target destination or whether the relay server used to send the message does not deliver messages as intended by the spammer. A network for sending messages according to the present disclosure may for example be the internet.

Embodiments may be beneficial in that they allow capturing spam messages and in particular spam emails earlier in the delivery cycle. Existing technologies are aimed at detecting spam at the inbox, i.e. at its target destination. In these traditional setups, the spam researcher is a passive recipient of spam messages and has no influence on the actual delivery process. According to the present disclosure a method is instead provided for capturing spam messages as part of the relay chain. By capturing spam messages during the actual delivery and not waiting passively for receiving the respective messages at the end of the relay chain, spam researcher may receive and process spam earlier. Thus, faster generation and deployment of updates for anti-spam products, in particular anti-spam software used by costumers, is enabled.

In addition to capturing new spam messages, i.e. potentially unknown types of spam messages, the time between capturing of messages and deploying of updates is important for the effectiveness of an anti-spam software product. If updates arrive after the customers have already been hit with a spam wave, the damage may have already been done rendering updates useless. A main drawback of traditional approaches is the timing. Research has shown that the bulk of most spam waves is transmitted within about 5 to 15 minutes. In this time frame an effective spam protection solution must have: a) received a copy of the spam wave; b) processed the received data and extracted signatures/heuristics characteristic for the spam wave; c) generated an update with anti-spam pattern for detection of the respective spam wave based on said signatures/heuristics; and d) deployed the update to all customers using related anti-spam software.

With modern technology and fast processing, this update deployment cycle may be reduced to about 3 minutes. However, spammers are able to spam everyone at the same time. This means that in the traditional approach customers receive spam messages of a spam wave at the same time as spam researchers with their honeypots. Therefore even update delivery turnarounds of only a few seconds would be too late.

The present disclosure describes a method to set up and run a computer system that acts as part of the spam relay chain instead of being a final recipient in order to detect spam messages before they are actually delivered to their target destinations. This may require setting up the system to look available for a prospective spammer, while preventing its actual usage as a spam relay. Received spam messages may be captured and used for analysis and research instead of delivering the respective messages to their target destinations.

Going up the relay chain closer to the source allows the invention to gather data on new spam messages ahead of delivery, thus allowing even more time-consuming spam analysis methods of the captured messages. Updates with new patterns for anti-spam detection based signatures extracted from the received messages may be generated and delivered to customers before they receive the first spam of a new spam wave.

Embodiments may be further beneficial in that they allow reducing or avoiding "blind spots". The problem of blind spots refers to spam messages that are delivered to customers but not seen on honeypots. This problem arises from the fact that spammers for example may not pick up advertised email addresses or may have implemented quality checks to ensure they are not delivering to honeypots. In this situation a given spam message may never be seen by the spam researcher, who is then unable to create updates for the customers leaving them completely unprotected.

Since the relay will receive spam messages for all kinds of recipients, i.e. target destinations, it is no longer necessary to get on a spammer's destination list. In other words, the relay server does not have to be chosen by the spammer as one of the target destinations for their spam campaign. The relay will therefore also be able to capture potentially unknown spam messages and expand the harvesting activity into territories, where no specific honeypot mailboxes have been set up. These territories may for example be geographic regions, where message destinations comprise language specific characteristics which would have to be taken into account, when setting up honeypots. For these territories it may be difficult to set up honeypots without the respective language specific knowledge. Since the relay is not connected to the destinations, these problems may be avoided by using a relay according to the present disclosure.

Embodiments may be beneficial in that they allow uncloaking of botnet IPs (internet protocols). Spammers have resorted to employing large botnets for spam delivery. As internet protocol (IP)-based blacklists have become a standard method in almost any spam protection solution, efforts have been made by spammers to protect the IPs of botnet clients to increase their longevity. Examples of these efforts are the use of compromised mail relay or proxy servers as a way to obfuscate the actual sending client with easy-to-replace middlemen in form of the servers. Due to this, it has become difficult for spam researchers to identify the devices, e.g., botnet devices, behind the mail relay or proxy servers for analysis and blocking. As the relay according to the present disclosure is in direct contact with the botnet clients, their IPs may be detected and processed easier than with the traditional honeypot approach.

Embodiments may be beneficial in that they allow reducing malicious traffic and resources needed for spam protection. A side-effect of a relay operated as a simulated message relay server may be that spam messages attempted to be sent through the relay will not reach the intended recipients, but rather be captured. This may reduce the chances of a false negative, i.e. delivering spam messages which are not recognized as being spam messages, e.g., since they are of a new, unknown type of spam messages. This is due to the fact that the method according to the present invention may be adapted to only deliver probe messages, but to preemptively capture all other messages received independently of any spam signatures. In other words, the detection on the relay is practically a specific kind of ham-detection: Only messages which are determined not to be spam, i.e. ham, and additionally comprise certain indicators characteristic for probe messages are detected and delivered to their target destinations. All other messages may be considered to be spam messages and used for identifying new types of spam not detectable with current anti-spam detection patterns. Thus, fewer resources may be needed on the recipients end for handling spam messages, since less spam messages arrive at their target destinations.

Embodiments may be beneficial in that they allow reducing operating costs. As the relay is part of the delivery sector and not a recipient, costly honeypot networks may be scrapped entirely. This reduces operating costs. Furthermore, in current approaches spam researchers material may be bolstered by subscribing to commercial spam feed providers. These spam feeds are directed towards the spam researcher's processing facilities and processed similar to regularly captured spam. However, these feeds have three major drawbacks: they may be polluted with non-spam, i.e. ham, messages reducing the reliability of the anti-spam patterns derived there from and increasing the likelihood of false positives, i.e. legitimate messages being blocked due to unreliable anti-spam pattern implemented in anti-spam software updates. Further, they may only provide a limited increase in coverage and finally they are expensive.

Traditional spam capture systems rely on large numbers of spam honeypots which accept incoming mail deliveries and forward them to spam analysis and processing devices. The novel approach discussed in this disclosure changes this traditional setup fundamentally by repositioning the spam capturing, i.e. moving from a passive recipient into the delivery sector and thus closer to a given spam messages origin.

This is realized by introducing a new type of message relay server, e.g., in form of an email relay server or proxy server. This relay may be reachable over the public internet and may also be connected to a spam researcher's analysis and processing data center. The message relay server may be implemented as a software-only solution for implementation on a network device, as a hardware-box, as a cloud offering or as a software as a service (SaaS) offering for usage by a network device. For the sake of simplicity the solution is referred to as "relay" although it may have different implementation forms.

The relay may be created using custom-tailored software in combination with off-the-shelf components such as a squid proxy. In an example, the relay may consist of a Linux OS running on hardware or a virtual machine (VM) and serving as a proxy server, e.g., a squid proxy. The proxy server may be set up in a way to allow incoming connections on the regular SMTP port, i.e. port 25, as well as certain other common service ports such as e.g., 3128, 8080, 8123, etc. The system may be connected to the internet both on the receiving and sending end.

The relay may be configured to accept traffic both on common SMTP and HTTP ports. However, the relay may not be configured as an open relay forwarding any and all traffic that arrives. Since spammers may send all kinds of malicious traffic, e.g., viruses, phishing messages, operating a completely open relay may make the operator liable for computer sabotage or negligent behavior. Thus, the relay may capture incoming traffic and not deliver it to the intended recipient, except for probe messages.

However, simply accepting all incoming traffic and capturing it without delivery may lead to a dropout of spam messages inflow as spammers may conduct quality control and quickly stop using systems that appear to be spam sinkholes. Therefore, the relay may determine when it is tested or probed by a potential spammer and let these probe messages, e.g., probe emails, pass in order to appear available and reliable in the eyes of potential spammers.

In order to divide the incoming traffic into potential spam on the one hand and probe messages on the other hand, one may not simply deploy a standard spam filter. This is because the incoming traffic comprises potentially new and unknown types of spam messages. Therefore, even if a received message may be later classified as spam, this classification cannot be done on the relay, as the underlying analysis or generating suitable patterns for anti-spam detection is yet to be conducted for these potentially new types of spam.

Therefore, the relay may advantageously apply a multi-staged approach, wherein the relay accepts all connections and traffic for common SMTP and HTTP proxy ports. The relay may monitor behavior of outside parties to see if they show interest in the relay, e.g., by probing the system. Furthermore, the relay may deploy a two-step filtering method. Potential probe messages are identified and passed through unhindered, while all non-probe messages are preemptively captured as potential spam messages for analysis for signs of spam, viruses, phishing etc.

In an example, a plurality of message relay servers may be distributed across geographies. A analysis and processing computer system configured to analyze messages captured by the mail relay server and generate patterns for future anti-spam detection based on the respective messages may additionally be located on or near the mail relay server or in a separate data center connected with the relay via a data connection. Newly generated patterns for anti-spam detection may be implemented by the computer system of the data center into updates for anti-spam software products which are delivered to download servers from which the products and in turn corresponding customers may download them.

To determine a relay's usefulness for spam campaigns spammers may probe, if the relay is an open relay suitable for their purposes. This may be done by sending a probe message that is harmless, for example a message that does not include malware. Further, the message is designed not to trigger spam detection, i.e. the message does not include spam signatures. The recipient of such a probe message is a mailbox under the spammer's control, usually a mailbox offered by a free webmail provider.

If the relay captured all incoming messages including probe messages, not receiving the probe message would signal to the spammer that the particular relay does not deliver messages as intended by the spammer and that messages sent to the respective relay will not reach their intended target destinations. Detecting such a behavior, a spammer will cease using this relay for their campaigns. He may also share this information about the relay apparently not delivering messages with other spammers, thus devaluating the relay entirely for spam messages harvesting.

However, if the probe message is delivered successfully to its intended target destination, the spammer may be enabled to verify this success using the mailbox under their control. In case of a positive verification, the spammer may usually start sending a spam wave using the verified relay within a short time scale, e.g., within about 60 minutes. Therefore, the relay identifies probe messages sent by a spammer and delivers said probe messages to their intended recipients.

In one embodiment and scenario, the embodiment a) simulates a message relay server on a network device, b) receives one or more messages for the message relay server, c) relays one or more probe messages with the message relay server based, at least in part, on an identification pattern of a probe message, wherein relaying the probe messages includes i) determining for each message of a set of received messages whether the message is a probe message based on said pattern, and ii) in a case where the message is determined to be a probe message, delivering the probe message to its target destination, d) captures, for a relayed probe message, one or more received messages that originated from an IP address of the relayed probe message; and e) processes the one or more received messages to generate one or more identification patterns that identify potential spam messages.

According to one scenario and embodiment, only the probe messages are delivered to their target destinations, whereas all received messages that are not determined to be probe messages are captured.

This may have the advantage that no spam messages are delivered by the message relay server which thus does not contribute to spam campaigns, but rather hinders the same. Since each received message, except those messages which are reliably determined to be probe messages, may be a potential spam message of a new and unknown type, preemptively capturing all received messages except for probe messages may have the advantageous of ensuring that no spam messages are missed when analyzing potential spam messages. Further, by successfully delivering probe messages spammers may be convinced that the simulated message relay server is suitable for spam campaigns, thus attracting spam messages.

According to one scenario and embodiment, a copy of each relayed probe message is saved and processed to facilitate generation of patterns for future probe message detection or future anti-spam detection.

This may have the advantage that based on an analysis of saved probe messages current patterns for probe message detection may be improved. Furthermore, information about the spammer sending the probe message may be extracted and used to counter future spam waves from the respective spammer.

According to one scenario and embodiment, the message relay server is an SMTP relay server and the received messages are emails and/or the relay server is a proxy server. According to one scenario and embodiment, the message relay server is one or both of an SMTP relay server and a proxy server, and the received messages are emails.

This may have the advantage that particular common spam emails, such as, for example, those based on the SMTP protocol and/or spam messages that are sent using HTTP protocol, may be effectively attracted and harvested.

According to one scenario and embodiment, all SMTP and/or HTTP ports of the message relay server are open, while all remaining ports are blocked.

This may have the advantage that SMTP and/or HTTP based messages may be attracted and harvested, while other attacks against the message relay server may be prevented by blocking other ports.

According to one scenario and embodiment, the processing of the captured messages includes sending the respective messages to a spam analysis computer system, which is configured to generate patterns for future anti-spam detection based on the respective messages.

This may have the advantage that instead of relaying the spam to the intended recipients, i.e. victims of a spam campaign, the message relay server may deliver potential spam messages to a researcher's datacenter which in turn may generate updates for deployment with customers. The spam analysis computer system may provide sufficient capacities to analyse large amount of potential spam messages in detail.

According to one scenario and embodiment, advertising the message relay server via the network is accomplished, at least in part, by including the message relay server in a publicly accessible list of message relay servers. In other words, according to one scenario and embodiment, the message relay server is advertised to potential spammers via a communication network by including the message relay server in a publicly accessible list of message relay servers.

This may have the advantage that by advertising the message relay server to potential spammers on known channels, such as e.g., public proxy lists, spammers searching for suitable relay servers for their spam campaigns may note the message relay server and in turn use the same by their botnet clients to deliver spam.

According to one scenario and embodiment, an identification pattern of the probe message is based, at least in part, on one or more of message content, message structure, message origin, target destination, sender activity, time of receipt, and a change of traffic volume to a target destination.

This may have the advantage that one or more indicators characteristic for probe messages based on different identification patterns may be taken into account in order to reliably determine probe messages.

According to one scenario and embodiment, the pattern based on message content comprises as an indicator for probe messages the criterion that the hostname or IP address of the message relay server is part of the message content. In other words, the identification pattern of the probe message includes, as an indicator for probe messages, a criterion that the hostname or IP address of the message relay server is part of the message content.

This may be advantageous, since spammers probing a large number of message relay servers for potential usage in large scale spam campaigns will tend to automatize the probing procedure and implement indicators in the probe message indicating which message relay server has been probed by a specific probe mail. A probe mail may for example be an email containing the hostname or IP address in the subject or body of the email. Thus, the spammer is enabled to easily check whether the probe of a specific email relay server was successful by searching their mailbox for an email containing the hostname or IP address of the respective email relay server.

According to one scenario and embodiment, a pattern based on message content or structure includes, as an indicator for probe messages, a criterion that at least part of the respective content or structure included in the pattern is known from previous messages that were identified as probe messages.

This may have the advantage to allow efficiently determining probe message, which may in general have characteristic contents and structures, like e.g., being very short and comprising random word and/or letter combinations, typos, in particular typos known from previous probe messages, and the hostname or IP address of the probed message relay server.

According to one scenario and embodiment, a pattern based on origin or destination includes, as an indicator for probe messages, a criterion that the respective origin or destination is an origin or destination is known from previously identified messages that were identified as probe messages. In one such embodiment and scenario, the identification pattern of the probe message that is based, at least in part, on one or more of message origin and message destination includes, as an indicator for probe messages, a criterion that a respective message origin or message destination is an origin or destination that is known from messages that have been previously identified as probe messages.

This may be advantageous, since probe messages may often be sent from the same origin to the same target destination. A spammer may use an origin, i.e. IP address, and target destination which are unsuspicious, e.g., which are not known from previous spam campaigns.

According to one scenario and embodiment, a pattern based on origin includes, as an indicator for probe messages, a criterion that, for a predetermined period of time, no messages from the respective origin are received by the message relay server. According to one such embodiment, the identification pattern of the probe message that is based, at least in part, on origin includes, as an indicator for probe messages, a criterion that for a predetermined period of time no messages from a respective origin have been received by the message relay server.

This may have the advantage that it may be characteristic for probe mails to be sent from specific origins which are exclusively used for this purpose. Since probe mails may be sent to the same message relay server at most once in a while, a long previous period of time without receiving messages from the respective origin is an indication for a probe message.

According to one scenario and embodiment, access attempts to the message relay server are tracked and a pattern based on sender activity comprises as an indicator for probe messages the criterion that a sending peer has been scanning on a port of the message relay server previously to sending its message. In one such embodiment, the embodiment includes a) tracking one or more access attempts to the message relay server, and b) generating an identification pattern of the probe message that is based, at least in part, on sender activity, wherein the identification pattern of the probe message includes, as an indicator for probe messages, a criterion that a sending peer has been scanning on a port of the message relay server prior to sending its message.

This may have the advantage that spammers, i.e. sending peers used by the spammers for sending messages, may often scan one or more ports of a server, when searching for new message relay servers usable for their spam campaigns. When a server with an open port suitable for relaying messages via the server is found, the spammer may send a probe message in order to probe whether the newly discovered potential message relay server is indeed a message relay server suitable for their purposes. Therefore, scanning a port, in particular standard ports used in SMTP and/or HTTP for receiving emails and/or messages, before sending a message is an indication for a probe message.

According to one scenario and embodiment, the pattern based sender activity comprises, as an indicator for probe messages, the criterion that a sending peer tries to connect with the message relay server using a protocol and server port combination not comprised in a predefined list of protocol and server port combinations. According to one such embodiment, the identification pattern of the probe message that is based, at least in part, on a pattern of sender activity includes, as an indicator for probe messages, a criterion that a sending peer attempts to connect with the message relay server using a protocol and server port combination that are not included in a predefined list of protocol and server port combinations.

This may have the advantage that based on such unusual activities a probe message may be determined. In general specific protocols are used to communicate on specific ports. Standard combinations are e.g., SMTP protocol on an SMTP port and HTTP protocol on a HTTP port. However, the sending peer may e.g., try HTTP CONNECT, i.e. HTTP protocol, on an SMTP port. This is an unusual kind of activity which is most unlikely to be observed for a reliable peer. However, it is possible to send messages based on such an approach, and thus a spammer may also try such unusual combinations in order to remain undetected for as long as possible.

According to one scenario and embodiment, the identification pattern of the probe message includes a plurality of indicators for probe messages. In one such embodiment, determining whether a message, of a set of received messages, is a probe message based on an identification pattern includes of: a) determining whether the message includes an indicator, b) in response to the message including the indicator, assigning a weighted factor for that indicator, c) computing an assessment value for the message based, at least in part, on the weighted factor, and d) determining whether the message is a probe message based, at least in part, on a comparison between the assessment value and a predetermined threshold value.

This may have the advantage that a plurality of different, and at least partially unrelated indicators, may be used to assess whether a given message is a probe message. Since different indicators may have different levels of significance, it may be advantageous to assign different weighted factors to the same. For example, the hostname or IP address of the message relay server being part of the message content is, in this example, a strong indicator and is assigned with a high weighted factor. In contrast, a sending peer simply being part of an IP space with known reputation for spamming, is, in this example, a less significant indicator and therefore assigned a smaller weighted factor.

According to one scenario and embodiment, a process is executed to preliminarily evaluate, for each received message, whether the respective message is a spam message based on preliminary spam heuristics. In case where the message is preliminarily evaluated to be a spam message, the respective message is captured. In the case where the message is preliminarily evaluated not to be a spam message, the message is assigned to a set of received messages that is checked for probe messages. According to one scenario and embodiment, the embodiment evaluates, for a received message, whether the message is a spam message based, at least in part, on spam heuristics, wherein messages that are determined to be spam messages are captured, and messages that are determined to not be spam messages are assigned to a set of received messages that are subsequently checked for probe messages.

This may have the advantage that the identification of probe messages may be performed more efficiently. As already pointed out above, known spam heuristics may in general be inappropriate for identifying new kind of spam messages, i.e. non-probe messages. However, spam heuristics may be used for a preliminary evaluation of spam messages. More precisely, messages evaluated to be spam messages based on known spam identification patterns are apparently spam messages. Such messages are in general no probe messages, since a spammer would try to avoid sending probe messages which may be detected by anti-spam software. By neglecting such spam messages, when determining probe messages, a set of potential probe messages may be selected for detailed analysis. Checking this set of messages may be faster and more efficient than checking all incoming messages. Thus, messages determined to be spam messages, based on known spam heuristics, may be directly captured. On the other hand, messages that are preliminarily evaluated to not be spam messages may nevertheless be a new kind of spam message that is undetectable based on known anti-spam patterns. Consequently, such an evaluation may only be preliminary, and a more detailed analysis of the message afterwards may show that the preliminary evaluation was incorrect, and that the messages are actually spam messages.

According to one scenario and embodiment, the embodiment rejects messages and/or delays receipt of messages that originate from an IP address, if the amount of messages received from the respective IP address has reached a predetermined threshold amount.

This may have the advantage that it allows capturing a plurality of botnet IPs. When messages, sent from a specific botnet client are rejected, a spammer may assume that the respective botnet client has been uncovered and try sending spam messages from another client of their botnet. Further, noting that the receipt of messages from one of their botnet clients is delayed, the spammer may also send additional messages from a different botnet client in order to compensate the delay. Through such adaptive connection manipulation, the spammers may thus reveal more of the botnet clients than are typically revealed with traditional honeypots.

According to one scenario and embodiment, the embodiment randomly rejects messages and/or responds to received messages with a response indicating that the server is overloaded.

This may have the advantage that a spammer that has not used the message relay server extensively may be motivated to uncover further botnet clients, which may allow for eventual identification of the spammer. This may be useful in a scenario where a spammer has not used the message relay server enough to be identified.

According to one scenario and embodiment, the embodiment rejects messages with a number of target destinations larger than a predetermined threshold number. For example, a message relay server, rejects messages with a number of target destinations larger than a predetermined threshold number.

This may have the advantage that the spammer may be motivated to use botnet clients in parallel in order to send their spam mails. In order to reach as many recipients as possible with their spam messages as fast as possible, spammers tend to choose a large number of recipients, i.e. target destinations, e.g., larger than 200. Such large numbers of recipients may be rather unusual for reliable, e.g., non-spam, messages. By choosing a predetermined threshold number significantly smaller, e.g., 25, spammers may motivated to compensate for the reduction in recipients by sending a plurality of messages from different botnet clients in parallel.

According to an example, the method further comprises responding to each received message with a response indicating that receiving the message was successful as long as the receipt of the message is not deliberately rejected or delayed by the messages relay server.

This may have the advantage that, to a spammer, it is not apparent that their spam messages, which are sent to the simulated message relay server, have not reached their target destinations, but instead have been captured. In some embodiments and scenarios, attracting and harvesting spam messages according to the present disclosure may work in multiple stages from advertising the relay to processing incoming traffic. An overview of exemplary stages may be given as follows: a) setting up and deploying a message relay server; b) advertising the message relay server; c) monitoring for and reacting to external probes and/or scans; d) reacting to incoming traffic; e) classifying incoming traffic; and f) taking action based on the classification. These steps will be described in more detail below.

Setting up and deploying a relay may comprise deploying a relay component, e.g., a squid proxy, configuring it to listen to all common Simple Mail Transfer Protocol (SMTP) relay ports and/or all common Hypertext Transfer Protocol (HTTP) proxy ports, e.g., 25, 8080, 3128, as well as installing the scripting and components necessary to do the classification and processing of traffic.

A firewall of the deployed system, for example, IP tables, may be configured to drop a predetermined amount of connections, e.g., every n-th connection attempt with n being an integer. This is both useful in terms of traffic management, but may also cause the spammers to reveal more botnet client IPs when trying to send messages from a second botnet client after messages from a first botnet client have been rejected. In an example, no throttling may be initially applied to incoming connections, in order to cause a spammer to start sending a spam wave via the relay. All other ports, apart from the SMTP and HTTP ports, may be blocked on the firewall. Tracking of all accesses, both allowed and denied accesses, may be set up for usage in connection management and for identifying probe messages.

Once the relay is operational, it may be made visible to the world, i.e. a public network. This may be done automatically by advertising the relay on public proxy lists. These offerings collect and monitor proxy pages and may be automatically scanned by spammers for new relays.

Apart from the advertisement the simple act of making certain ports available to the outside may be advertisement enough as research has shown that spammers may be constantly scanning IP ranges for specific port areas. If a given spam researcher bind multiple IPs to the same system to forward traffic from multiple endpoints to the relay, this is also useful to provide several access points to prospective spammers.

The system according to the present disclosure may be set up to work similar to a HTTP/Transmission Control Protocol (TCP) proxy. Once set up, it is automatically advertised in proxy lists and queried using proxy checking tools, which in turn report the system as available to third-parties. The system may record and analyze queries made by the proxy checkers to determine which requests are automatic probes. These probe queries are stored in a database and used later on to determine, if a probing request is made against the system. This phase may, for example, be conducted for around an hour, after which the collection phase is stopped. In case of a scenario where traffic to the system completely stops at a future point in time, the system may be configured to automatically re-advertise.

Once this setup step is completed, the system may start accepting traffic on the ports listed above. Any and all traffic received and captured may either be analyzed on the system itself, e.g., by a locally installed anti-spam analysis solution, stored and archived or relayed to a different location for processing and research.

The system may furthermore be set up to list directly to SMTP connections on, for example port 25. In this case, the system runs very similar to a regular mail relay server. However, in contrary to a regular mail relay server, the relay according this disclosure may be configured to pre-emptively filter out all potential spam messages, while only letting through probe messages sent by spammers in order to probe the relay.

The difference here is that the probe messages cannot be directly triggered as it was possible for proxy checkers. Instead, one has to identify these probe messages on the stream of incoming traffic, what may happen spontaneously.

In some scenarios, spammers send an initial set of messages to identify and avoid closed honeypots before starting to send their spam waves through it. Therefore, in some embodiments, detection of probe messages may initially operate under the assumption that the first few messages that are received by a relay are almost all probe messages that are being used to determine if the relay is capable of delivering such messages.

In some embodiments, the system may analyze all incoming traffic e.g., for the following criteria in order to determine probe messages: a) body and/or subject of a message contains one or more of the relays own IP addresses; b) body and/or subject of a message contains the network address translated (NAT'ed) IP address of the system, if applicable; c) body and/or subject of a message contains the, fully qualified, domain name of the relay; and d) messages tend to be short and lacking of content, in particular meaningful content.

Furthermore, messages that are received during the very first time interval of operation, for example, in the first few hours, may, in general, be considered probing messages. However, in some embodiments and scenarios, a similarity analysis may still determine that a plurality of messages are of the same type, and/or structure, are received within a specific period of time, for example, a ten minute window, and thus indicate the start of a spam wave.

In some embodiments and scenarios, all messages received this way may be relayed to their intended target destinations, and may be automatically analyzed to create a statistic classifier, such as a Bayes filter, or a "known good" database of features denoting a probe message like a probe email. This may allow the system to improve automatic detection of probe messages in the future.

In some embodiments and scenarios, all traffic that are received beyond the initial setup period or do not match the classifier and/or are known to not be spam, may preemptively be considered to be new, unknown spam and captured for spam analysis. In some embodiments and scenarios, all captured messages may not be delivered to their target destinations. In some embodiments and scenarios, during operations of the relay a group of new probe messages are detected, these messages are relayed to their target destinations to keep the relay attractive for spammers.

As part of public proxy list entries, or by simply offering open ports to the internet, the relay may be subjected by probes and scans. These probes and scans attempt to determine the availability and reliability of the relay for relaying spam messages by checking whether a connection may be established on a given port and/or if the relay responds well to certain commands. These commands may range from a basic connection handshaking to checking an open port over. In some cases the commands also include functions that range from trying to send SMTP messages to sending specific HTTP requests.

As such, in some embodiments and scenarios, processes for monitoring for and reacting to external probes and/or scans are included as part of the embodiment. The relay may be provided with a pattern-based list of requests to be let through to the internet, for example, known probe URLs, as well as parts or indicators that suggest a probe is being made, e.g., specific URLs or message parts. The relay may also simulate the behavior of an operational SMTP relay by properly reacting to SMTP commands, for example, HELO/EHLO, MAIL FROM, DATA, etc., by replying suitably according to the SMTP protocol without actually delivering the received email to their target destinations.

The relay may also monitor connection attempts and patterns on the firewall and determine, if an outside party is scanning open ports or sending known attack patterns, using e.g., off-the-shelf intrusion detection programs. In both cases the address of the connection peers on the internet may be recorded and flagged as potential spam senders for future use.

Reacting to incoming traffic may comprise: When new traffic on either the HTTP or SMTP side is detected, the relay may determine if it actually accepts it. This may e.g., be done by checking, if the sending peer has sent a given amount of messages over the last hour, e.g., 200 messages in that hour. If this limit has been reached or surpassed the connection may either be rejected entirely, packets may be dropped or it may be throttled, e.g., to a set number of bytes per second or certain delays after each SMTP command.

Furthermore, the relay may randomly drop a connection and/or send a message indicating that the service is overload. For example, simulating an overloaded service status, by sending a SMTP "421 TOO BUSY" or HTTP "429 TOO MANY REQUESTS" or HTTP "503 SERVICE UNAVAILABLE" message.

These rejection patterns may be designed to both offer methods of managing incoming traffic as well as coaxing spammers into using more of their botnet clients for sending messages, e.g., emails. The logic behind this design is that once a spammer has found a working relay, which is suddenly blocking requests by one of their botnet clients, may in general assume that the respective client has been blacklisted or throttled. If that is the case, he may continue sending their spam campaign with a different botnet client as long as he assumes that the relay is an available open relay which is suitable for their campaign.

Another method of connection management may be limiting the number of allowed recipients per mail being sent. Spammers try to reach as many recipients as possible with a given message and thus create messages with sometimes more than 200 recipients. Rejecting messages with more than 25 recipients may cause spammers to behave similar to the case of connection throttling: They may use more botnet clients to send their messages in order to compensate for the restrictions.

These methods disclosed therefore may not only allow effective management of received traffic, but may also trick the spammer into revealing more of the botnet clients at their disposal. This is a further advantage over traditional honeypots, where the relationship between spam messages and botnet clients for a given spam message is usually just 1:1.

If the message has been accepted for further processing by the relay, then the origin IP and geo-location may be recorded for future reference.

Taking action based on classification: If an aggregation of indicators shows the message to be a likely probe message, a copy of the respective message may be saved for analysis and the respective messages may be forwarded to its intended recipient. If the message is not determined to be a probe message, it may be captured for analysis processing and not be forwarded to its target destination. In both cases, the relay may pretend as if the reception has succeeded by sending a SMTP "250 OK" or a HTTP "200 OK" or a similar response.

IP addresses are an effective and cheap way for security products to identify and block attackers or spammers. The system according to the present disclosure may be set up in a way to effectively and efficiently attract and harvest new attacker or spammer IPs by: Reducing connections allowed per IP address, thus prompting spammers to use more of their IP pool to deliver a given spam wave. Monitoring if a given IP is probing and/or sending on multiple ports to determine if said IP's intentions point towards a spammer or attacker, since regular systems usually do not probe. Using host and/or client fingerprint analysis on the received packets and packet streams, the system may determine if the sending client is most likely an infected pc, e.g., botnet, or belongs to a specific kind of spamming software. This may allow researchers to tie sending IPs to botnets or to known malicious operators.

The system may be used to create networks between senders and/or destinations for specific spam waves or languages. This allows, for example, to determine that spam destined for a certain first country or region being usually sent using gateways in a second country or region. This knowledge may be used when finding new spots for deployment to address missing spam harvesting coverage.

Due to the largely automated nature of the method disclosed herein, the method may be easily deployed in a cloud environment, as a reaction to specific emergent threats. For example, the system may be used in combination with anti-spam analysis. This may allow the system to be automatically deployed based on customer feedback. If, for example, customers receive a large amount of false negative feedback, then the system according to the present disclosure may be deployed in selected destinations based on the knowledge of from where these customers are usually being attacked.

Figure 4:
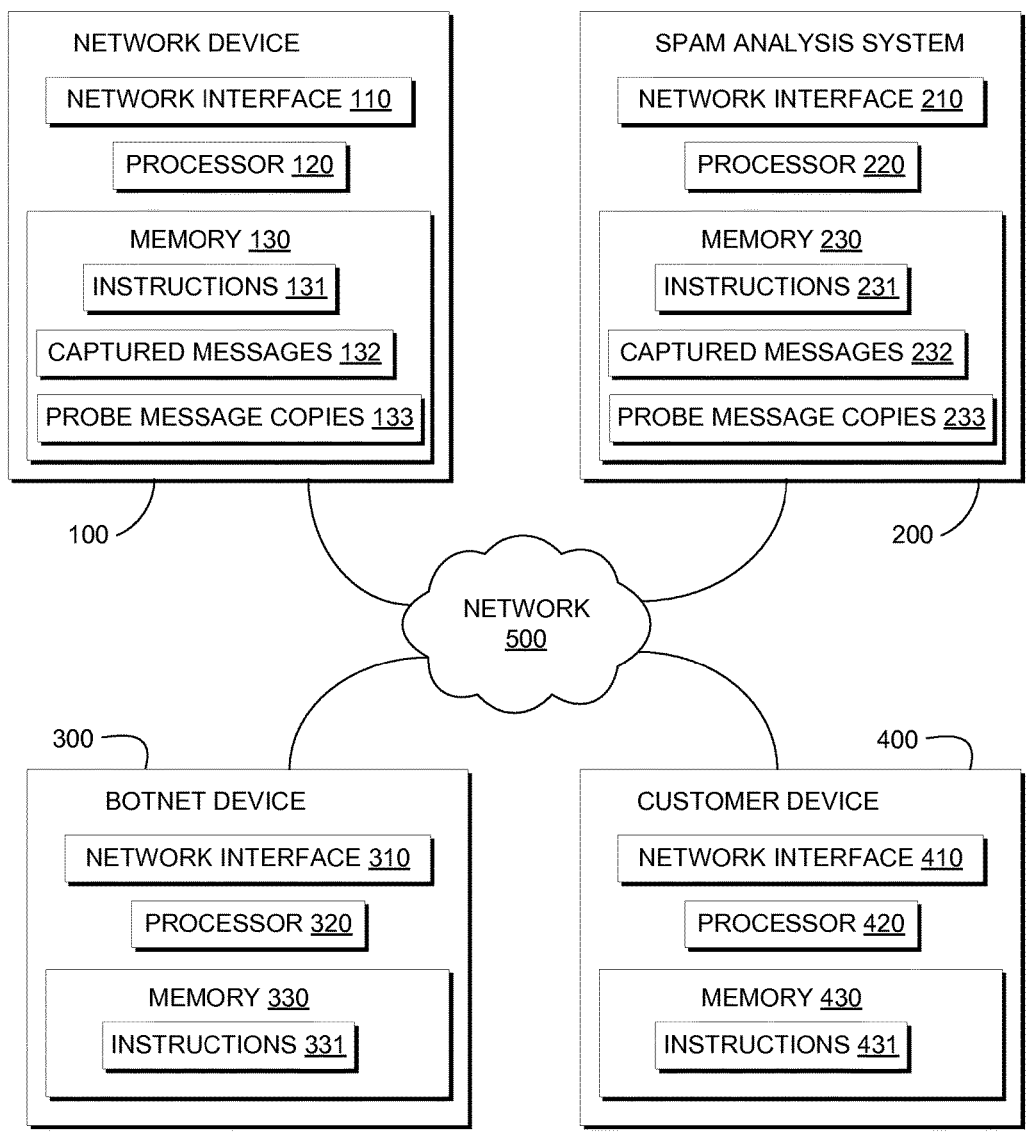
FIG. 4 depicts a schematic block diagram illustrating an exemplary network environment including a network device simulating the simulated message relay server, in accordance with an exemplary embodiment of the present invention.

FIG. 1 is a schematic block diagram illustrating an exemplary network environment that includes a simulated message relay server, such as network device 100 as shown in FIG. 4, in accordance with an exemplary embodiment of the present invention. A spammer using spam device 600 is controlling a plurality of botnet clients or botnet devices 301, 302, 303 to send spam. The target destination of the spam messages that are sent from botnet devices 301, 302, 303 are, for example, a plurality of customer devices, such as customer devices 401, 402, 403. Customer devices 401, 402, 403 may be provided with an anti-spam software, i.e. they belong to customers of an entity providing the software. Customer devices 401, 402, 403 are further provided with updates of anti-spam patterns for the anti-spam software by spam analysis system 200. Spam analysis system 200 analyzes spam messages and generates new anti-spam patterns for new kinds of spam messages identified by the analysis. Botnet devices 301, 302, 303 try to send spam messages to customer devices 401, 402, 403 via message relay servers 100, 101.

Message relay server 100 is a simulated message relay server that receives spam potential messages, e.g., potential spam messages that were received from the botnet devices 302, 303, but does not relay those potential spam messages to their target destinations, i.e. the customer devices 401, 402, 403. Instead, message relay server 100 captures the spam messages and sends the captured messages to the spam analysis system 200, which generates patterns for anti-spam detection based on the respective received spam messages. The spam messages may further be distributed via additional message relay servers, such as for example, second message relay server 101. Such additional message relay servers may relay spam messages unrestrictedly to customer devices 401, 402, 403. Since the spam messages are captured by message relay server 100 on an early stage of the relay chain, anti-spam pattern updates for new spam waves may be provided by spam analysis system 200 to customer devices 401, 402, 403 before the respective spam waves reach customer devices 401, 402, 403 via second message relay server 101. Thus, customer devices 401, 402, 403 may be protected from new spam waves.

Furthermore, message relay server 100 receives spam messages directly from botnet devices 302, 303, which enables an uncloaking of the system that was used by a spam device 600 to send the spam messages. However, in order to be used as a message relay server by botnet devices 302, 303, i.e. to receive new spam messages which can be analyzed, message relay server 100 has to verify to the spammer that it is a message relay server suitable for a spam campaign. Therefore, probe messages sent to message relay server 100 in order to probe message relay server 100 may not be captured, but is instead delivered to their target destination, i.e. a mailbox device 601 that has a mailbox controlled by spam device 600. Thus, a spammer can verify, by receiving a probe message sent via message relay server 100, that server 100 indeed relays messages as intended by the spammer.

Figure 2:
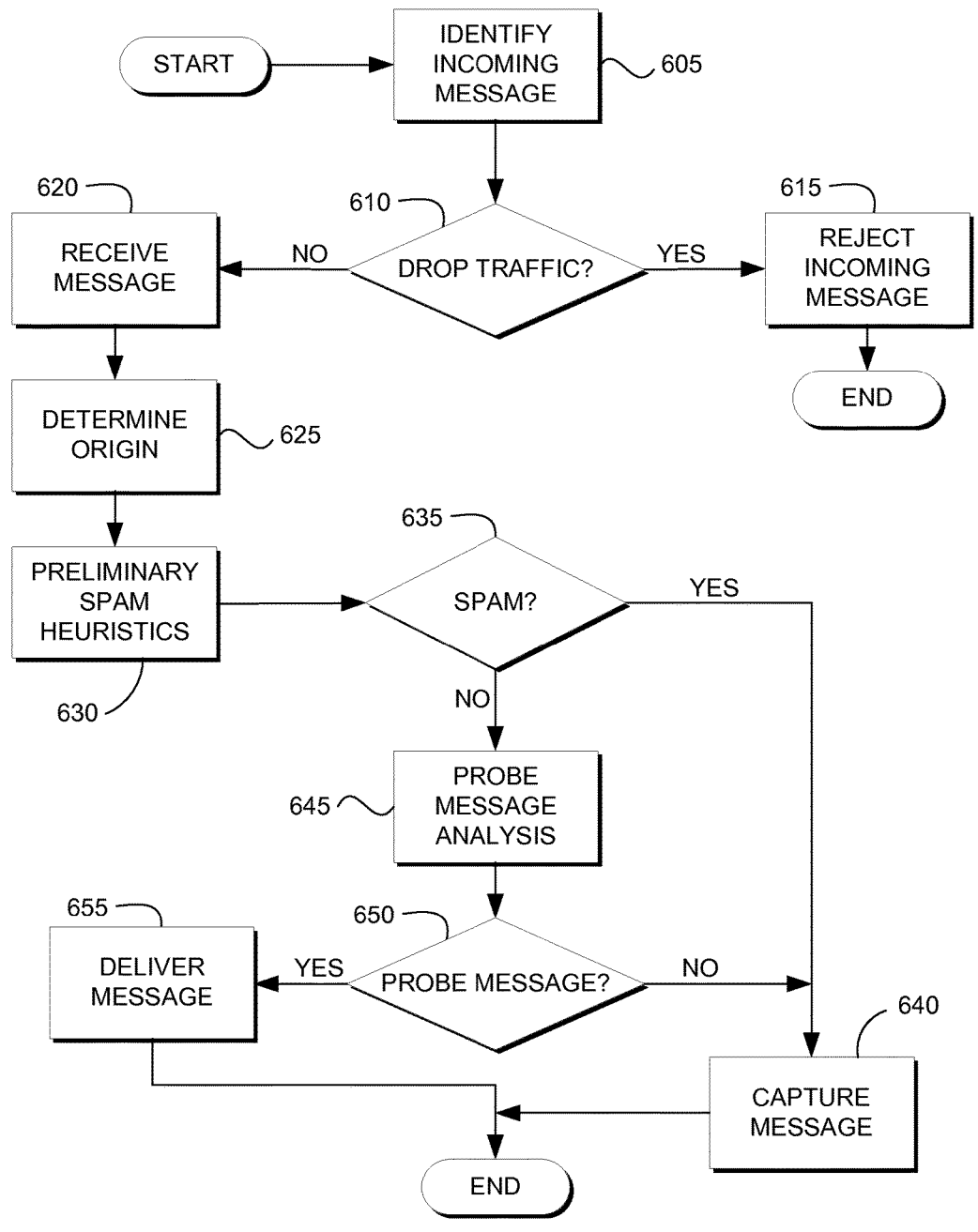
FIG. 2 depicts a schematic flow diagram illustrating an exemplary method for attracting and harvesting spam messages, in accordance with an exemplary embodiment of the present invention.

FIG. 2 is a schematic flow diagram illustrating an exemplary method for attracting and harvesting spam messages, in accordance with an exemplary embodiment of the present invention. In process 605, an incoming message is identified. In determination process 610, for the incoming message, it is determined whether to drop the traffic. In one embodiment, the traffic from a specific IP address may is determined to be dropped, when, for example, the amount of messages received from the respective IP address has reached a predetermined threshold amount. If it is determined to drop the traffic (determination process 610, YES branch), then the incoming message is rejected in process 615. If it is determined not to drop the traffic (determination process 610, NO branch), the message is received in process 620, its origin, e.g., sending IP address and geo-location, is determined in process 625, and preliminary spam heuristics, which are based on anti-spam patterns, are applied in process 630. In determination process 635 it is determined whether or not the message is preliminarily identified as spam, based, at least in part, on the results of processes 625 and 630. If the message is preliminarily determined to be a spam message (determination process 635, YES branch), then it is captured and made available for further detailed spam analysis in process 640. If it is preliminarily determined not to be a spam message (determination process 635, NO branch), then a probe message analysis is applied in order to determine whether the message is a probe message in process 645. In determination process 650, it is determined whether the message is a probe message. If the message is a probe message (determination process 650, YES branch), then the message is delivered to its target destination in process 655. If the message is not a probe message (determination process 650, NO branch), then the message is captured, see process 640, and is available for a detailed spam analysis. Further description regarding determination step 650 is provided below in the discussion of FIG. 3.

Figure 3:
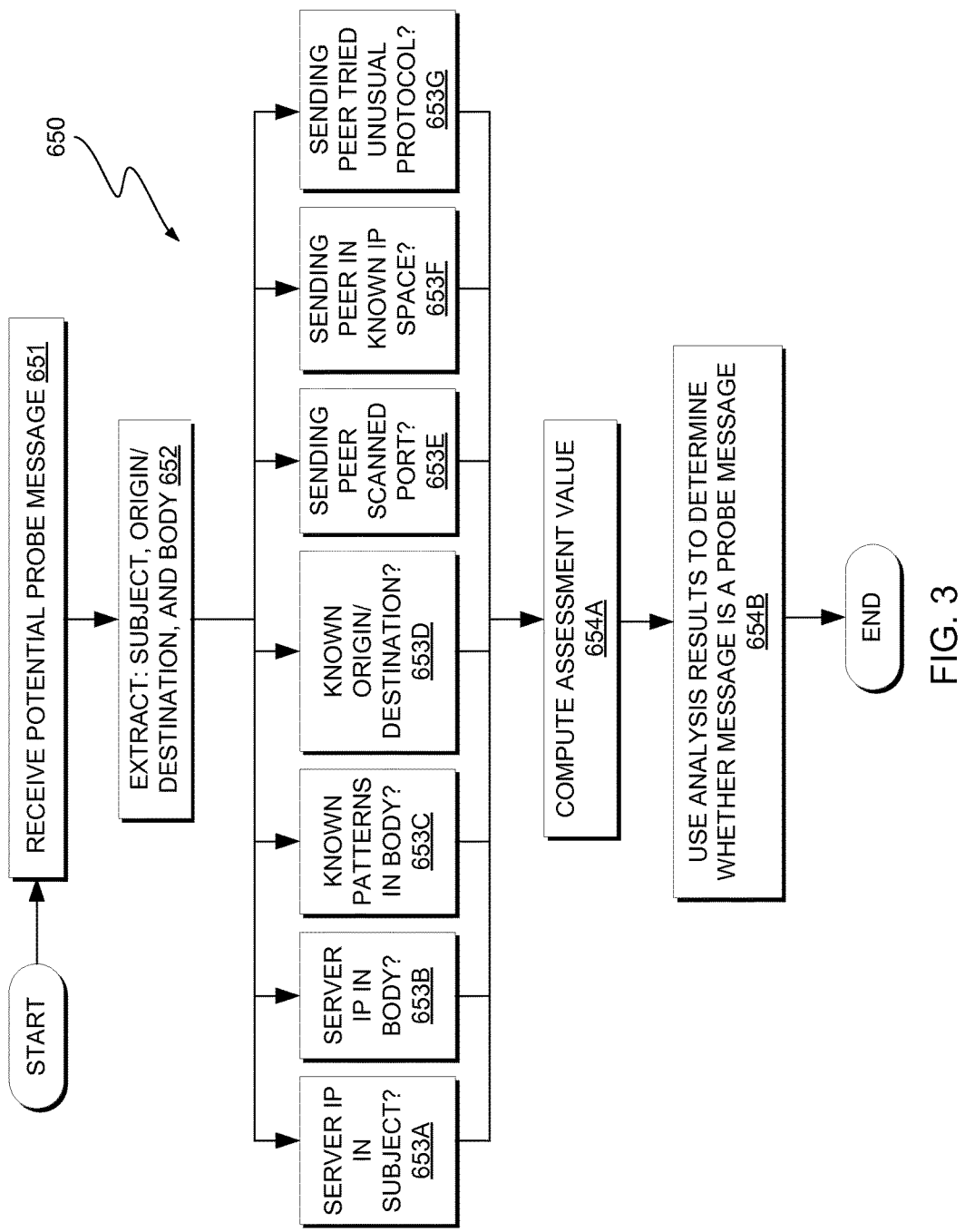
FIG. 3 depicts a schematic flow diagram illustrating an exemplary method for determining probe messages, in accordance with an exemplary embodiment of the present invention.

FIG. 3 is a schematic flow diagram illustrating an exemplary method for determining probe messages, in accordance with an exemplary embodiment of the present invention. Traffic received by a relay according to the present disclosure may be classified according to the following two-step process. Firstly, by detecting and handling known spam messages. Secondly, by detecting probe messages.

To perform the first step, the incoming traffic is transferred to a spam detector, which may, for example, be a custom solution or an integrated off-the-shelf product, which are known to and understood by those skilled in the art. This spam detector may determine if a message is already detected by existing methods to have strong indicators for spam using approaches such as signature-based detection, heuristics or statistical learning, e.g., based on Bayesian spam filtering. If the message is determined to be known spam, it may be captured and forwarded to a spam researcher's data center for further processing. The message may not be delivered to the intended recipient.

The second step is illustrated in FIG. 3. A potential probe message is received, in process 651. From a potential probe message, its subject, origin, destination and body are, if possible, extracted and analyzed based on probe message identification patterns, in process 652. In general, the probe message analysis is configured to filter out probe messages sent by a spammer as outlined before. This may be achieved by a combination of indicators and approaches like the ones shown in FIG. 3, such indicators are identified in the following processes.

In process 653A, it is determined whether a server hostname and/or IP of the relay is detected in the subject of the message or a non-standard header of the message. For example, one or more of the hostnames or IPs of the relay are found or referenced in the subject or a non-standard header of the message, e.g., an X-header or completely non-standard header.

In process 653B, it is determined whether a hostname or IP of the relay is detected in message body or attachments of the message. For example, one or more of the hostnames or IPs of the relay are found or referenced in the message's body or in one of its attachments.

In process 653C, it is determined whether a known test patterns is found in the message's header and/or body. For example, patterns used in previous test messages are repeated in the header or body of the email. The patterns may either be an identical match or may be identified using fuzzy matching.

In process 653D, it is determined whether a sender and/or recipient of the message are known from earlier spam waves. For example, the sender or recipient has already been referenced in the header or body of messages received earlier.

In process 653E, it is determined whether the sending peer has scanned HTTP and/or SMTP ports or the relay system in general. For example, the sending peer has at least attempted to scan the relay's ports either entirely or SMTP and/or HTTP ports specifically. If only specific ports have been probed this may be classified as a stronger indicator than a general scan.

In process 653F, it is determined whether the sending peer is part of IP ranges that are known sources of spamming. For example, the sending peer is found in IP ranges from which other attacks have been conducted from previously or that are more likely to be used for spammers, e.g., dial-up, dynamic IP, and/or mobile IP ranges. The relay may determine automatically, how narrow or wide a given IP range may be set to, and may also use third-party IP information to determine how likely a given IP range is to be used by spammers, e.g., IP ranges that have been flagged by third-party sources.

In process 653F, it is determined whether the sending peer tried an unusual protocol or unusual protocol-port-combination, e.g., HTTP CONNECT on SMTP port. For example, the sending peer tried to connect an assumed to be incompatible protocol on the SMTP port which is a strong indicator of a spammer as regular, legitimate systems do not show such a behavior in general.

In process 653E, it is determined whether the sending peer has used an unusual protocol. If the sending peer has used an unusual protocol, for example, has performed penetration and/or vulnerability scanning of the relay system (not depicted) then it is determined that the sending peer has used an unusual protocol. In another example, the sending peer has employed common vulnerability scanning method to find attack sectors on the relay. In this scenario and embodiment, all future traffic sent from this peer is considered potentially hostile.

In one embodiment, if no traffic has been seen from a given sending peer within a sufficiently long predetermined period of time, e.g., in over 180 days, or the sending peer is not known to be a source of spam, then it is determined that it is unlikely that the sending peer is a spammer sending a probe message. For example, if no traffic has been seen from this system for a long time, then this is an indicator for probe messages as the spammer will mostly use systems that have a good or neutral reputation, for not having spammers, for probing. In general, spammers may use different systems for sending probe messages and spam messages.

In process 654A, based on the above determinations of certain indicators being present, the relay determines an assessment value, i.e. a probability score, that the sent message is a probe message. In some embodiments, certain factors are combined with weighted factors depending on their likelihood of indicating a probe message. In some embodiments, certain factors are not used if they are not present, do not apply to an IP range, and/or have been found to be unreliable indicators of whether the message is a probe message. This determination is, in one example, done on-the-fly based on a preconfigured set of rules.

In process 654B, it is determined, based on the above processes and results of the analysis, whether or not the sent message is a probe message (see determination process 650 of FIG. 2). If the potential probe message is determined to be a probe message based on the above outlined probe message analysis, the message is delivered to its target destination (see process 655 of FIG. 2). If the message is determined not to be a probe message, then it is not delivered. Instead, it is captured and made available for detailed spam analysis (see process 640 of FIG. 2).

FIG. 4 depicts a schematic block diagram illustrating an exemplary network environment that including network device 100 that is simulating the message relay server, in accordance with an exemplary embodiment of the present invention. Network device 100 includes memory 130 with machine executable instructions 131, processor 120 for executing machine executable instructions 131, and network interface 110 for receiving and sending data, e.g., via network 500. Execution of machine executable instructions 131 by processor 120 causes processor 120 to control network device 100 for attracting and harvesting spam messages. Network device 100 is connected to network 500, e.g., the internet, and may receive messages from botnet device 300.

Received messages are analyzed by network device 100 according the method of FIG. 2 and FIG. 3. Messages determined to be probe messages are delivered to their target destinations and only copies 133 may be saved in memory 130. All other messages received are captured on memory 130. Captured messages 132 are delivered to spam analysis system 200 for a detailed spam analysis. Furthermore, copies 133 of the probe messages may be forwarded to spam analysis system 200. Captured messages 132 and probe messages 133 may e.g., be sent to spam analysis system 200 via network 500 or via a direct data connection.

Spam analysis system 200 includes memory 230, with machine executable instructions 231, processor 220 for executing machine executable instructions 231, and network interface 210 for receiving and sending data, e.g., via network 500. Execution of machine executable instructions 231 by processor 220 causes processor 220 to control spam analysis system 200 and to perform a spam analysis on captured messages 232, which are provided by network device 100 and stored in memory 230. In addition, copies of probe messages 233, which are provided by network device 100 and which are stored in the memory 230, may be used for spam analysis by spam analysis system 200. Based on the analysis of captured messages 232 and copies of probe messages 233, spam analysis system 200 generates patterns for future anti-spam detection. These patterns are implemented in updates for anti-spam software and provided to customer device 400 via network 500.

Customer device 400 includes memory 430, which includes machine executable instructions 431, processor 420 for executing machine executable instructions 431, and interface 410 for receiving and sending data via network 500. Machine executable instructions 431 include instructions for anti-spam software for protecting customer device 400 against spam. These machine executable instructions 431 are updated with updates provided by spam analysis system 200 via network 500.

Botnet device 300 comprises a memory 330 with machine executable instructions 331, processor 320 for executing the machine executable instructions 331 and interface 310 for receiving and sending data via network 500. Execution of executable instructions 331 by processor 320 causes processor 320 to generate spam messages and to send those spam messages, via network 500, to network device 100. Network device 100 relays those spam messages to customer device 400, which is their intended target destination.

In various embodiments of the present invention, each of network device 100, spam analysis system 200, botnet device 300 and customer device 400 are respectively a computing device that can be a standalone device, a server, a laptop computer, a tablet computer, a netbook computer, a personal computer (PC), or a desktop computer. In another embodiment, one or more of network device 100, spam analysis system 200, botnet device 300 and customer device 400 represent a computing system utilizing clustered computers and components to act as a single pool of seamless resources. In general, each of network device 100, spam analysis system 200, botnet device 300 and customer device 400 can be any computing device or a combination of devices that are capable of executing the methods described in reference to FIGS. 1-4. Each of network device 100, spam analysis system 200, botnet device 300 and customer device 400 may respectively include internal and external hardware components, as depicted and described in further detail with respect to FIG. 5.

In this exemplary embodiment, instructions 131, 231, 331 and 431, along with captured messages 132 and 232, and probe message copies 133 and 233, are respectively stored on at least one of memory 130, 230, 330, or 430. However, in other embodiments, instructions 131, 231, 331 and 431, along with captured messages 132 and 232, and probe message copies 133 and 233 may be stored externally and accessed through a communication network, such as network 500. Network 500 can be, for example, a local area network (LAN), a wide area network (WAN) such as the Internet, or a combination of the two, and may include wired, wireless, fiber optic or any other connection known in the art. In general, network 500 can be any combination of connections and protocols that will support communications between network device 100, spam analysis system 200, botnet device 300 and customer device 400, and instructions 131, 231, 331 and 431, along with captured messages 132 and 232, and probe message copies 133 and 233, in accordance with a desired embodiment of the present invention.

Figure 5:
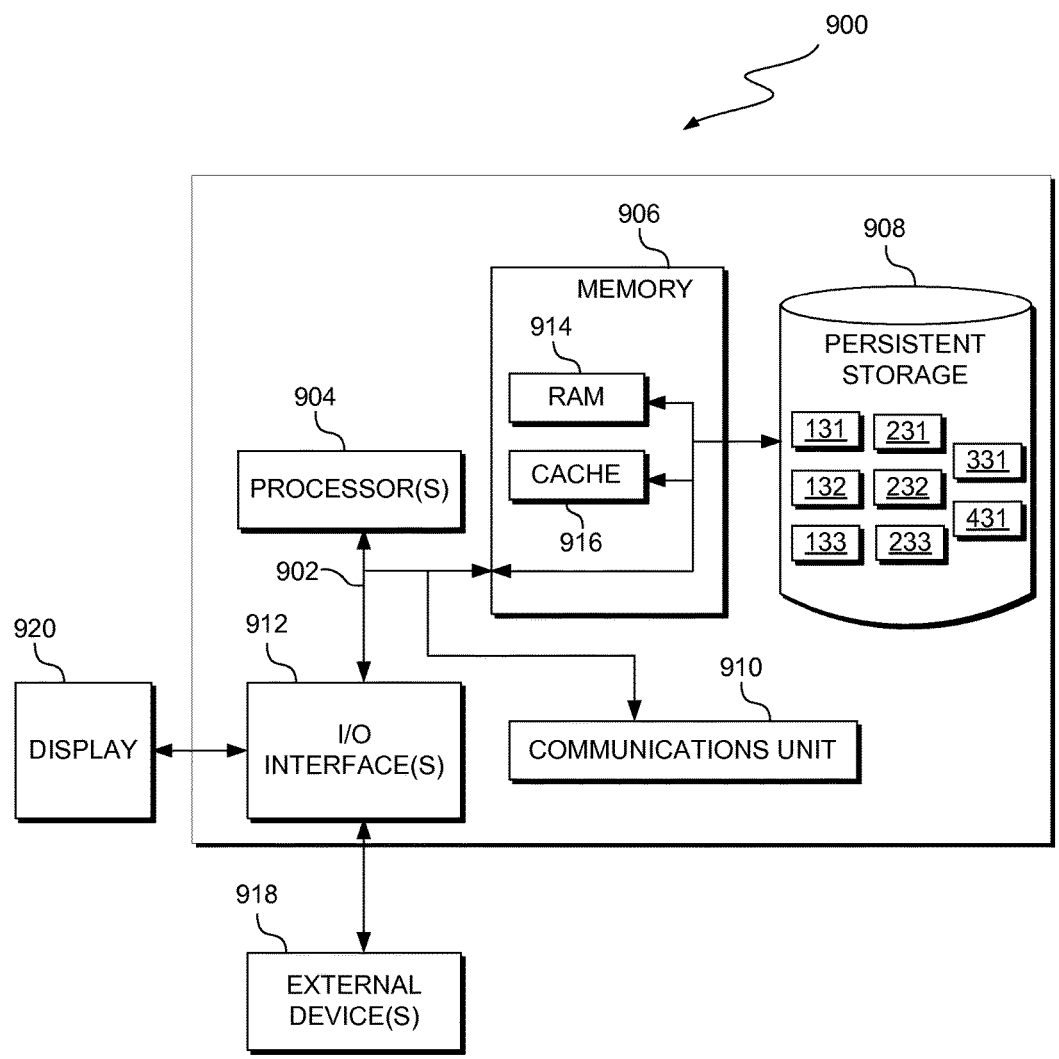
FIG. 5 depicts a block diagram of components of the computing device executing the exemplary methods for attracting and harvesting spam messages and for determining probe messages, in accordance with an exemplary embodiment of the present invention.

FIG. 5 depicts a block diagram, 900, of components of network device 100, spam analysis system 200, botnet device 300 and customer device 400, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Network device 100, spam analysis system 200, botnet device 300 and customer device 400 respectively include communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 914 and cache memory 916. In general, memory 906 can include any suitable volatile or non-volatile computer-readable storage media.

Instructions 131, 231, 331 and 431, along with captured messages 132 and 232, and probe message copies 133 and 233 are stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices, including resources of network 500. In these examples, communications unit 910 includes one or more network interface cards. Communications unit 910 may provide communications through the use of either or both physical and wireless communications links. One or more of instructions 131, 231, 331 and 431, along with captured messages 132 and 232, and probe message copies 133 and 233 may be downloaded to persistent storage 908 through communications unit 910.

I/O interface(s) 912 allows for input and output of data with other devices that may be connected to one or more of network device 100, spam analysis system 200, botnet device 300 and customer device 400. For example, I/O interface 912 may provide a connection to external devices 918 such as a keyboard, keypad, a touch screen, and/or some other suitable input device. External devices 918 can also include portable computer-readable storage media such as, for example, thumb drives, portable optical or magnetic disks, and memory cards. Software and data used to practice embodiments of the present invention, e.g., one or more of instructions 131, 231, 331 and 431, along with captured messages 132 and 232, and probe message copies 133 and 233, can be stored on such portable computer-readable storage media and can be loaded onto persistent storage 908 via I/O interface(s) 912. I/O interface(s) 912 also connect to a display 920.

Display 920 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method of attracting and harvesting spam messages, the method comprising:
   receiving, by one or more processors, one or more messages for a message relay server that (i) identifies a spam message based, at least in part, on the spam message matching one or more identification patterns for spam messages and (ii) prevents the sending of the spam message to a target destination of the spam message;
   relaying, by the one or more processors, a first message, included in the one or more messages, to a target destination of the first message, based, at least in part, on a determination that a pattern of the first message matches, at least in part, an identification pattern, that identifies probe messages, comprising a first identification pattern for probe messages that differentiates between probe messages and spam messages;
   capturing, by the one or more processors, for a relayed probe message, a second message that originated from an IP address of the relayed probe message; and
   processing, by the one or more processors, the one or more messages and the second message to generate an identification pattern that identifies potential spam messages.

2. The method of claim 1, wherein the message relay server (i) delivers probe messages to the respective target destinations of the probe messages, and (ii) captures received messages that are determined to be spam messages.

3. The method of claim 1, wherein a copy of the relayed probe message is saved and processed for generating the identification pattern that identifies potential spam messages.

4. The method of claim 1, wherein the message relay server is one or both of an SMTP relay server and a proxy server and the received one or more messages are emails.

5. The method of claim 1, the method further comprising:
   advertising, by the one or more processors, the message relay server via a communication network by including the message relay server in a publicly accessible list of message relay servers.

6. The method of claim 1, wherein the identification pattern that identifies probe messages further comprises a second identification pattern for probe messages is based, at least in part, on one or more of message content, message structure, message origin, target destination, sender activity, time of receipt, and a change of traffic volume to a target destination.

7. The method of claim 6, wherein the identification pattern that identifies probe messages further comprises a third identification pattern for probe messages includes, as an indicator for probe messages, a criterion that a hostname or IP address of the message relay server is part of a content of the message.

8. The method of claim 6, wherein the identification pattern that identities probe messages further comprises a third identification pattern for probe message that is based, at least in part, on one or more of message content and message structure includes, as an indicator for probe messages, a criterion that at least part of a respective content or structure is known from messages that have been previously identified as probe messages.

9. The method of claim 6, wherein the identification pattern that identifies probe messages further comprises a third identification pattern for probe messages that is based, at least in part, on one or more of message origin and message destination includes, as an indicator for probe messages, a criterion that a respective message origin or message destination is an origin or destination that is known from messages that have been previously identified as probe messages.

10. The method of claim 6, wherein the identification pattern that identifies probe messages further comprises a third identification pattern for probe messages that is based, at least in part, on origin includes, as an indicator for probe messages, a criterion that for a predetermined period of time no messages from a respective origin have been received by the message relay server.

11. The method of claim 6, the method further including:
   tracking, by the one or more processors, one or more access attempts to the message relay server; and
   generating, by the one or more processors, a third identification pattern for probe messages that is based, at least in part, on sender activity, wherein the third identification pattern of the probe message includes, as an indicator for probe messages, a criterion that a sending peer has been scanning on a port of the message relay server prior to sending a message.

12. The method of claim 6, wherein the identification pattern that identifies probe messages further comprises an third identification pattern for probe messages that is based, at least in part, on a pattern of sender activity includes, as an indicator for probe messages, a criterion that a sending peer attempts to connect with the message relay server using a protocol and server port combination that are not included in a predefined list of protocol and server port combinations.

13. The method of claim 6, the method comprising:
determining, by the one or more processors, that the first message includes an indicator, wherein the identification pattern, which identifies probe messages, of the message includes a plurality of indicators for probe messages;
assigning, by the one or more processors, a weighted factor for the indicator;
computing, by the one or more processors, an assessment value for the first message based, at least in part, on the weighted factor; and
determining, by the one or more processors, whether the first message is a probe message based, at least in part, on a comparison between the assessment value and a predetermined threshold value.

14. The method of claim 1, the method comprising:
evaluating, by the one or more processors, whether a given message is a spam message based, at least in part, on spam heuristics, wherein messages that are determined to be spam messages are captured, and messages that are determined to not be spam messages are assigned to a set of received messages that are subsequently checked for probe messages.

15. The method of claim 1, the method comprising one or both of:
rejecting, by the one or more processors, at least one message that originates from a particular IP address, if the amount of messages received from the particular IP address reach a first predetermined threshold amount; and
delaying, by the one or more processors, a reception of at least one message that originates from the particular IP address, if the amount of messages received from the particular IP address reach a second predetermined threshold amount.

16. The method of claim 1, the method comprising:
rejecting, by the one or more processors, a given message at random; and
responding, by the one or more processors, to the given message with a response indicating that the message relay server is in overload.

17. The method of claim 1, wherein a given message with a number of target destinations that is larger than a predetermined threshold number is rejected by the message relay server.

18. A computer program product for attracting and harvesting spam messages, the computer program product comprising:
one or more computer-readable storage media and program instructions stored on the one or more computer-readable storage media, the program instructions comprising:
program instructions to receive one or more messages by a message relay server, wherein the message relay server (i) identifies a spam message based, at least in part, on the spam message matching one or more identification patterns for spam messages and (ii) prevents the sending of the spam message to a target destination of the spam message;
program instructions to relay a first message, included in the one or more messages, to a target destination of the first message, based, at least in part, on a determination that a pattern of the first message matches, at least in part, a first identification pattern for probe messages that differentiates between probe messages and spam messages;
program instructions to capture, for a relayed probe message, a second message that originated from an IP address of the relayed probe message; and
program instructions to process the one or more messages and the second message to generate an identification pattern that identifies potential spam messages.

19. The computer program product of claim 18, wherein the first identification pattern for probe message includes, as an indicator for probe messages, a criterion that a hostname or IP address of the message relay server is part of a content of the message.

20. A computer system for attracting and harvesting spam messages, the computer system comprising:
one or more computer processors;
one or more computer readable storage medium;
program instructions stored on the computer readable storage medium for execution by at least one of the one or more processors, the program instructions comprising:
program instructions to receive one or more messages by a message relay server, wherein the message relay server (i) identifies a spam message based, at least in part, on the spam message matching one or more identification patterns for spam messages and (ii) prevents the sending of the spam message to a target destination of the spam message;
program instructions to relay a first message, included in the one or more messages, to a target destination of the first message, based, at least in part, on a determination that a pattern of the first message matches, at least in part, a first identification pattern for probe messages that differentiates between probe messages and spam messages;
program instructions to capture, for a relayed probe message, a second message that originated from an IP address of the relayed probe message; and
program instructions to process the one or more messages and the second message to generate an identification pattern that identifies potential spam messages.

* * * * *